(12) United States Patent
Kwack et al.

(10) Patent No.: US 11,175,429 B2
(45) Date of Patent: Nov. 16, 2021

(54) METHOD FOR DETECTING VESSEL OF INDUCTION HEATING DEVICE TO WHICH THREE-PHASE POWER SUPPLY IS APPLIED

(71) Applicant: LG Electronics Inc., Seoul (KR)

(72) Inventors: Younghwan Kwack, Seoul (KR); Seongho Son, Seoul (KR); Jaekyung Yang, Seoul (KR); Yongsoo Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 72 days.

(21) Appl. No.: 16/687,940

(22) Filed: Nov. 19, 2019

(65) Prior Publication Data
US 2020/0158905 A1 May 21, 2020

(30) Foreign Application Priority Data
Nov. 19, 2018 (KR) .................. 10-2018-0143013

(51) Int. Cl.
*G01V 3/10* (2006.01)
*H05B 6/06* (2006.01)

(52) U.S. Cl.
CPC .............. *G01V 3/10* (2013.01); *H05B 6/06* (2013.01)

(58) Field of Classification Search
CPC ........ G01V 3/10; H05B 6/06; H05B 2213/05; H05B 6/062; H05B 6/00–44
See application file for complete search history.

(56) References Cited

U.S. PATENT DOCUMENTS

| | | | | |
|---|---|---|---|---|
| 5,968,398 A | * | 10/1999 | Schmitt | H05B 6/062 219/620 |
| 2010/0258556 A1 | * | 10/2010 | Hayashi | H05B 6/065 219/661 |
| 2012/0043312 A1 | * | 2/2012 | Lee | H05B 6/062 219/622 |

(Continued)

FOREIGN PATENT DOCUMENTS

| | | |
|---|---|---|
| EP | 2405714 A1 | 1/2012 |
| EP | 3291643 A1 | 3/2018 |

(Continued)

OTHER PUBLICATIONS

Extended European Search Report in European Appln. No. 19194012.1, dated Mar. 31, 2020, 5 pages.

*Primary Examiner* — Daniel R Miller
(74) *Attorney, Agent, or Firm* — Fish & Richardson P.C.

(57) ABSTRACT

A method controls an induction heating device that is configured to operate based on a multi-phase power supply and that includes a working coil configured to heat an object and a controller configured to detect the object. The method includes: receiving voltage information related to a first input voltage and a second input voltage that are supplied by the multi-phase power supply and that have different phases from each other; selecting a reference voltage among the first input voltage and the second input voltage based on the voltage information; determining a detection time point, which corresponds to a time instant at which a detection operation is to be performed for detecting the object on the working coil, based on the reference voltage; and performing the detection operation at the detection time point.

20 Claims, 13 Drawing Sheets

(56) References Cited

U.S. PATENT DOCUMENTS

2013/0320000 A1    12/2013   Shan et al.
2018/0063897 A1     3/2018   Park et al.
2019/0373683 A1*   12/2019   Yun .................... H05B 6/664

FOREIGN PATENT DOCUMENTS

EP        3331321 A1    6/2018
KR       20150074065    7/2015

* cited by examiner

METHOD FOR DETECTING VESSEL OF INDUCTION HEATING DEVICE TO WHICH THREE-PHASE POWER SUPPLY IS APPLIED

CROSS-REFERENCE TO RELATED APPLICATION

The present disclosure claims priority to and the benefit of Korean Patent Application No. 10-2018-0143013, filed on Nov. 19, 2018, the disclosure of which is incorporated herein by reference in its entirety.

FIELD

The present disclosure relates to a method for detecting a vessel of an induction heating device to which a three-phase power supply is applied.

BACKGROUND

Various types of cooking utensils may be used to heat food in homes and restaurants. For example, gas ranges may use gas as fuel. In some cases, cooking devices may use electricity to heat an object such as a vessel (or a cooking vessel) or a pot, for example.

A method of heating an object via electricity may be classified into a resistive heating method and an induction heating method. In the electrical resistive method, heat may be generated based on current flowing through a metal resistance wire or a non-metallic heating element, such as silicon carbide, and may be transmitted to the object through radiation or conduction, to heat the object. In the induction heating method, eddy current may be generated in the object made of metal based on a magnetic field generated, around the coil, when a high-frequency power of a predetermined magnitude is applied to the coil to heat the object.

In some cases, an induction heating device may have a function for detecting whether the object is present on a working coil, namely, a function for detecting a vessel.

For example, FIG. 1 shows an induction heating device that has a function for detecting a vessel in the related art. The induction heating device in the related art will be described with reference to FIG. 1.

FIG. 1 is a schematic view of the induction heating device in the related art.

Referring to FIG. 1, the induction heating device includes a power supply 61, a switching unit 62, a working coil 63, a zero point detector 64, a controller 65, and a current converter 66 in the related art.

In this example, the power supply 61 may provide the switching unit 62 with direct current (DC), and the switching unit 62 may provide the working coil 63 with resonant current through switching. The zero point detector 64 may detect a zero point of a commercial power supply and transmits a zero-point signal to the controller 65. The current converter 66 may measure the resonance current flowing through the working coil 63 to transmit information on a voltage fluctuation waveform to the controller 65. The controller 65 may control an operation of the switching unit 62 based on the information on the zero-point signal and the voltage fluctuation waveform received from the zero point detector 64 and the current converter 66, respectively.

The controller 65 may calculate a voltage value based on the information on the zero-point signal and the voltage fluctuation waveform received from the zero point detector 64 and the current converter 66, respectively. Then, when the voltage value calculated by the controller 65 deviates from a predetermined fluctuation range, the controller 65 may determine that the vessel 70 is not present on the working coil 63.

In some cases, another working coil adjacent to a working coil to be detected may be operated in the induction heating device. In this case, noise may occur in an input voltage applied to the working coil to be detected. Further, accuracy in the detection of the vessel may be deteriorated due to the noise.

SUMMARY

The present disclosure provides a method for detecting a vessel of an induction heating device capable of minimizing noise generated by an operation of a working coil adjacent to a working coil to be detected.

The present disclosure also provides a method for detecting a vessel of an induction heating device capable of improving accuracy in the detection of the vessel.

The objects of the present disclosure are not limited to the above-mentioned objects, and other objects and advantages of the present disclosure which are not mentioned can be understood by the following description and more clearly understood by the implementations of the present disclosure. It will also be readily apparent that the objects and advantages of the present disclosure may be realized by features described in claims and a combination thereof.

According to one aspect of the subject matter described in this application, a method controls an induction heating device that is configured to operate based on a multi-phase power supply and that includes a working coil configured to heat an object and a controller configured to detect the object. The method includes: receiving voltage information related to a first input voltage and a second input voltage that are supplied by the multi-phase power supply and that have different phases from each other; selecting a reference voltage among the first input voltage and the second input voltage based on the voltage information; determining a detection time point, which corresponds to a time instant at which a detection operation is to be performed for detecting the object on the working coil, based on the reference voltage; and performing the detection operation at the detection time point.

Implementations according to this aspect may include one or more of the following features. For example, selecting the reference voltage among the first input voltage and the second input voltage may include: determining a maximum voltage point of the first input voltage based on a time instant of a zero voltage point of the first input voltage; identifying a first time point corresponding to the maximum voltage point of the first input voltage; identifying a second time point corresponding to a maximum voltage point of the second input voltage; determining a time difference between the first time point and the second time point; comparing the time difference to a predetermined reference value; and based on a result of the comparison, selecting one of the first input voltage or the second input voltage as the reference voltage.

In some examples, selecting the reference voltage based on the result of the comparison may include: based on the time difference being greater than or equal to the predetermined reference value, selecting the first input voltage as the reference voltage; and based on the time difference being less than the predetermined reference value, selecting the second input voltage as the reference voltage.

In some implementations, determining the detection time point may include: determining intersection time points at which a first waveform corresponding to the first input voltage and a second waveform corresponding to the second input voltage intersect each other; determining intersection voltage levels corresponding to the intersection time points; determining maximum time points at which the reference voltage reaches a maximum voltage level; and determining the detection time point among the intersection time points, the detection time point that is subsequent to one of the maximum time points and that corresponds to an intersection voltage level lower than other intersection voltage levels.

In some implementations, the induction heating device further includes a rectifier configured to rectify an input voltage into a half-wave form and an inverter configured to drive the working coil. In these implementations, the method further may include: rectifying a voltage output from the multi-phase power supply to generate the first input voltage and the second input voltage in the half-wave form; and applying the first input voltage and the second input voltage to the inverter to drive the working coil.

In some implementations, the voltage information may include: information on a first waveform corresponding to the first input voltage and a second waveform corresponding to the second input voltage; and information on one or more time points at which the first waveform intersects the second waveform.

In some examples, n performing the detection operation may include: controlling an inverter of the induction heating device to charge the working coil with energy; measuring, by a sensor of the induction heating device, a current in the working coil; converting a first current value of the current measured by the sensor into a first voltage value; comparing, by a shutdown comparator of the induction heating device, the first voltage value to a predetermined reference resonance value; and controlling a switch driver of the induction heating device to cause resonance of the current in the working coil based on the first voltage value being greater than the predetermined reference resonance value.

The detection operation may further include: measuring, by the sensor, a resonant current in the working coil based on the resonance of the current in the working coil; converting a second current value of the resonant current in the working coil into a second voltage value; comparing the second voltage value to a predetermined reference count value to generate an output pulse; comparing at least one of (i) a count of the output pulse to a predetermined reference count, or (ii) an on-duty time of the output pulse to a predetermined reference time; and determining whether an object is present on the working coil based on a result of the comparison.

In some examples, the inverter may include a first switching element and a second switching element that are configured to be turned on and off by a switching signal received from the switch driver, where controlling the inverter may include controlling one or both of the first switching element and the second switching element.

In some examples, charging the working coil with energy may include turning on the first switching element and turning off the second switching element. In some examples, controlling the switch driver to cause the resonance of the current in the working coil may include turning off the first switching element and turning on the second switching element. In some examples, controlling the switch driver to cause the resonance of the current in the working coil may include maintaining an output signal of the shutdown comparator in an activated state for a predetermined period of time.

In some implementations, comparing the second voltage value to the predetermined reference count value to generate the output pulse may include: generating the output pulse in an on-state based on the second voltage value being greater than the predetermined reference count value; and generating the output pulse in an off-state based on the second voltage value being less than the predetermined reference count value.

In some examples, the count of the output pulse may include a number of instances at which the output pulse is changed from the off-state to the on-state. In such examples, determining whether the object is present on the working coil may include: determining that the object is present on the working coil based on the count being less than the predetermined reference count, and determining that the object is not present on the working coil based on the count being greater than the predetermined reference count.

In some examples, the on-duty time of the output pulse may include an accumulated time for the on-state of the output pulse. In such examples, determining whether the object is present on the working coil may include: determining that the object is present on the working coil based on the on-duty time being less than the predetermined reference time; and determining that the object is not present on the working coil based on the on-duty time being greater than the predetermined reference time.

In some implementations, receiving the voltage information may include: sensing, by a sensor of the induction heating device, a voltage that is applied to the working coil and that includes a plurality of phases; and based on the sensed voltage, determining a first waveform corresponding to the first input voltage and a second waveform corresponding to the second input voltage. In some examples, the intersection voltage levels may include: a plurality of low voltage points corresponding to a voltage level in a range of 40%-60% of the maximum voltage level; and a plurality of high voltage points corresponding to a voltage level in a range of 70%-90% of the maximum voltage level. In such examples, determining the detection time point may include determining a time point corresponding to one of the plurality of low voltage points among the intersection time points.

In some implementations, performing the detection operation may further include: based on an amplitude of the output pulse, determining whether the output pulse corresponds to an on-state or an off-state, wherein the output pulse may include a plurality of on-state pulses and a plurality of off-state pulses; accumulating durations of the plurality of on-state pulses of the output pulse; and determining the on-duty time of the output pulse based on the accumulated durations of the plurality of on-state pulses of the output pulse.

In some implementations, performing the detection operation may further include: counting a number of instances at which the output pulse is changed from an off-state to an on-state; and determining the number of instances as the count of the output pulse.

In some examples, determining the intersection time points may include determining time instants at which the first waveform and the second waveform have an equal amplitude. In some examples, determining the maximum voltage point of the first input voltage may include determining an amplitude of the first input voltage that is normalized with respect to a voltage range between the zero voltage point and the maximum voltage point of the first input voltage.

A specific effect of the present disclosure, in addition to the above-mentioned effect, will be described together while describing a specific matter for implementing the present disclosure.

DETAILED DESCRIPTION

The above mentioned objects, features, and advantages of the present disclosure will be described in detail with reference to the accompanying drawings, so that those skilled in the art to which the present disclosure pertains may easily implement the technical idea of the present disclosure.

Figure 1:
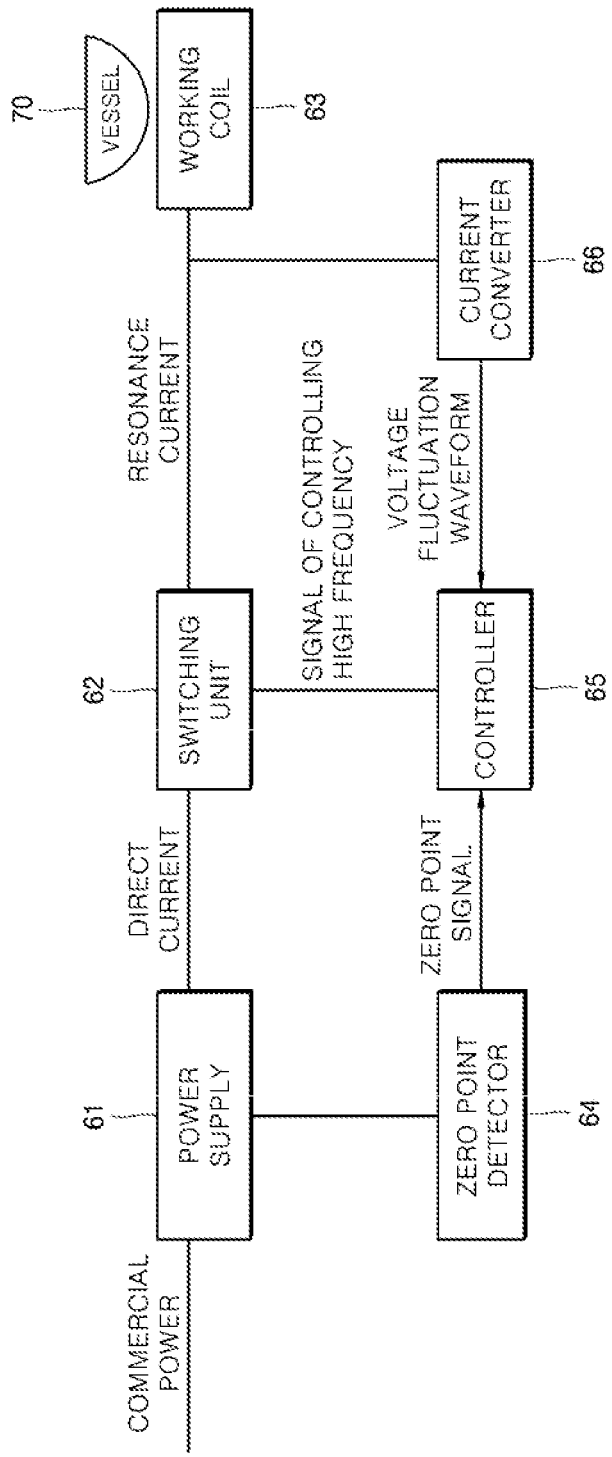
FIG. 1 is a schematic view of an example of an induction heating device in the related art.
Figure 2:
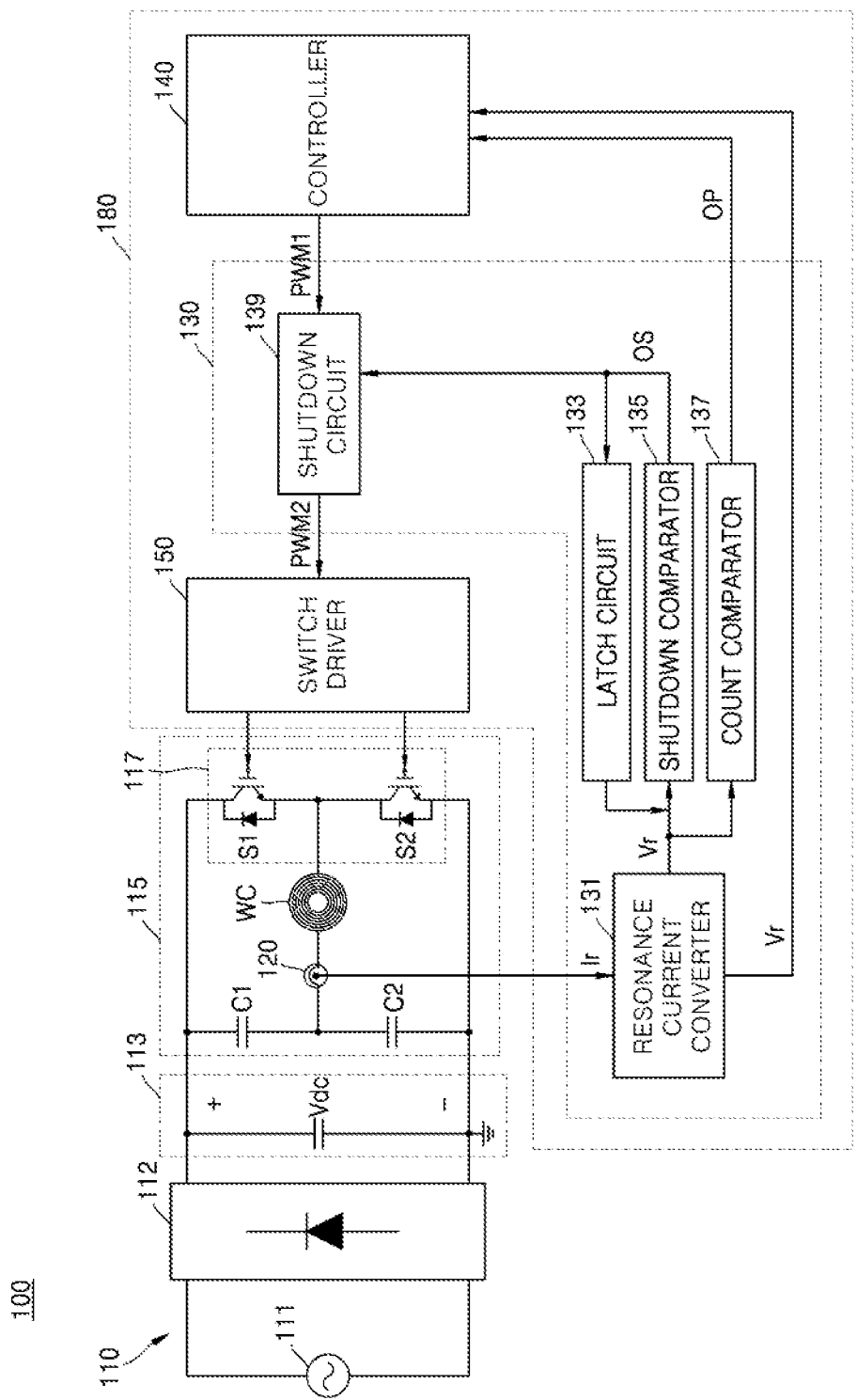
FIG. 2 is a schematic view of an example of an induction heating device according to an implementation of the present disclosure.
Figure 3:
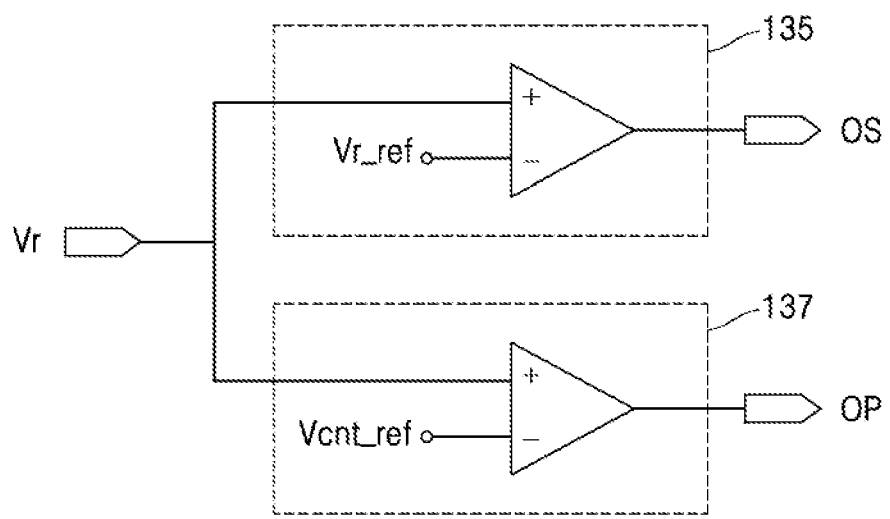
FIG. 3 is a schematic view of an example shutdown comparator and an example count comparator of FIG. 2.

FIG. 2 is a schematic view of an example of an induction heating device according to an implementation of the present disclosure. FIG. 3 is a schematic view of a shutdown comparator and a count comparator of FIG. 2.

Referring to FIGS. 2 and 3, an induction heating device 100 includes an induction heating circuit 110 that drives a working coil WC, a sensor that measures current flowing through the working coil WC, and a controller 180 that controls an induction heating circuit 110 based on the current measured by the sensor 120.

An induction heating circuit 110 may include a power supply 111, a rectifier 112, a direct current (DC) link capacitor 113, and an induction heater 115.

The power supply 111 may output alternating current (AC) power based on a three-phase power supply.

Specifically, the power supply 111 may output the AC power and may provide the rectifier 112 with the AC power and the three-phase power supply may be applied to the power supply 111, for example.

The rectifier 112 may convert the AC power received from the power supply 111 into a DC power and supply the DC power to an inverter 117.

Specifically, the rectifier 112 may rectify the AC power received from the power supply 111 and may convert the AC power into the DC power. The rectifier 112 may also provide the DC link capacitor 113 with the DC power converted by the rectifier 112.

In some implementations, the rectifier 112 may include, but is not limited to, a bridge circuit that has one or more diodes.

The DC link capacitor 113 may receive the DC power from the rectifier 112 and may reduce ripple of the DC power received from the rectifier 112. The DC link capacitor 113 may also include a smoothing capacitor, for example.

In addition, the DC link capacitor 113 receives the DC power from the rectifier 112, so that DC voltage Vdc (hereinafter; referred to as "input voltage") may be applied to both ends of the DC link capacitor 113.

In some implementations, a three-phase power supply is applied to the power supply 111, and an input voltage Vdc applied to the DC link capacitor 113 may include first and second input voltages having different phases from each other. Details thereof will be described below.

As described above, a DC power (or DC voltage) that is rectified by the rectifier 112 and that has reduced ripple by the DC link capacitor 113 may be supplied to the inverter 117.

The induction heater 115 may drive a working coil WC.

Specifically, the induction heater 115 may include the inverter 117 and a resonance capacitor (that is, C1 and C2).

First, the inverter 117 includes two switching elements S1 and S2. The first and second switching elements S1 and S2 are alternately turned-on and turned-off based on a switching signal received from a switch driver 150, so that the DC power is converted into a high frequency of AC (that is, resonance current). Thus, the converted high-frequency of AC may be provided to the working coil WC.

In some implementations, the first and second switching elements S1 and S2 may include, but are not limited to, for example, an insulated gate bipolar transistor (IGBT).

The resonance capacitor may include first and second resonance capacitors C1 and C2 connected in parallel with the first and second switching elements S1 and S2, respectively.

Specifically, when the voltage is applied to the resonance capacitors C1 and C2 based on the switching of the inverter 117, the resonance capacitors C1 and C2 start to resonate. Further, when the resonance capacitors C1 and C2 resonate, the magnitude of the current flowing through the working coil WC connected to the resonance capacitors C1 and C2 is increased.

Through such a process, eddy current is induced into an object (for example, a cooking vessel) located on the working coil WC connected to the resonance capacitors C1 and C2.

In some implementations, the working coil WC may include at least one of, for example, a single coil structure having a single coil, a dual coil structure having an inner coil and an outer coil, and a multi-coil structure having a plurality of coils.

In some implementations, the sensor 120 may measure a value Ir of the current flowing through the working coil WC.

Specifically, the sensor 120 may be connected to the working coil WC in series, and may measure the value Ir of the current flowing through the working coil WC.

In some implementations, the sensor 120 may include, for example, a current measuring sensor that directly measures the current value, and may include a current transformer.

When the sensor 120 includes the current measuring sensor, the sensor 120 may directly measure the value Ir of the current flowing through the working coil WC and may provide a resonance current converter 131 described below with the information on the measured current value Ir. In some examples, when the sensor 120 includes the current transformer, the sensor 120 may convert a magnitude of the current flowing through the working coil WC by the current transformer to provide the resonance current converter 131 with the current in which the magnitude of which is changed.

However, for convenience of explanation, in the implementation of the present disclosure, the sensor 120 includes the current measuring sensor that directly measures the value of the current Ir flowing through the working coil WC.

In some implementations, the sensor 120 may be a component included in the induction heating circuit 110 or the controller 180, which is not an independent component depending on the situation. However, for convenience of explanation, in the implementation of the present disclosure, the sensor 120 is an independent component.

The controller 180 may include the vessel detector 130, the controller 140, and the switch driver 150.

First, the vessel detector 130 may determine a state of a second pulse signal PWM2 (particularly, PWM2-HIN of FIG. 4) provided to the switch driver 150 based on the value of the current measured by the sensor 120.

Further, the vessel detector 130 may include a resonant current converter 131, a latch circuit 133, a shutdown comparator 135, a count comparator 137, and a shutdown circuit 139.

Specifically, the resonance current converter 131 may convert the value Ir of the current measured by the sensor 120 into a voltage value Vr. The resonance current converter 131 may also transmit the information on the converted voltage value Vr to the shutdown comparator 135, the count comparator 137, and the controller 140, respectively.

That is, the resonance current converter 131 may convert the value Ir of the current received from the sensor 120 into the voltage value Vr and may transmit the information on the converted voltage value Vr to the shutdown comparator 135, the count comparator 137, and the controller 140, respectively.

The voltage value, provided by the resonance current converter 131, to the shutdown comparator 135 is different from the voltage value, provided by the resonance current converter 131, to the count comparator 137, and the details thereof will be described below.

In some implementations, the resonance current converter 131 may be omitted. In this case, the information on the value Ir of the current measured by the sensor 10 may be transmitted to the shutdown comparator 135, the count comparator 137, and the controller 140.

However, for convenience of explanation, in the implementation of the present disclosure, the induction heating device 100 includes the resonance current converter 131.

The shutdown comparator 135 compares whether the voltage value Vr received from the resonance current converter 131 is greater than a predetermined reference value of resonance Vr_ref.

Specifically, the shutdown comparator 135 may compare the voltage value Vr received from the resonance current converter 131 with a predetermined reference value of resonance Vr_ref.

That is, the shutdown comparator 135 activates an output signal OS when the voltage value Vr received from the resonance current converter 131 is greater than the predetermined reference value of resonance Vr_ref. The shutdown comparator 135 deactivates the output signal OS when the voltage value Vr received from the resonance current converter 131 is less than a predetermined reference value of resonance Vr_ref.

A meaning of activating the output signal OS may include a meaning of outputting the output signal OS at a high level (for example, '1'). A meaning of deactivating the output signal OS may include a meaning of outputting the output signal OS at a low level (for example, '0').

The output signal OS of this shutdown comparator 135 may be provided to the shutdown circuit 139.

A state of the second pulse signal PWM2 (particularly, PWM2-HIN of FIG. 4) output from the shutdown circuit 139 is determined depending on the activation or the deactivation of the output signal OS, and details thereof will be described below.

A latch circuit 133 may maintain the activation state of the output signal OS output from the shutdown comparator 135 for a predetermined period of time.

Specifically, when the output signal OS of the shutdown comparator 135 is activated, the latch circuit 133 may maintain an activation state of the output signal OS output from the shutdown comparator 135 for a predetermined period of time.

The count comparator 137 may compare whether the voltage value Vr received from the resonance current converter 131 is greater than a predetermined reference value of count Vcnt_ref and may output the output pulse OP based on a result of comparison.

Specifically, when the voltage value Vr received from the resonance current converter 131 is greater than a predetermined reference value of count Vcnt_ref, the count comparator 137 outputs the output pulse OP in an on-state.

When the voltage value Vr received from the resonance current converter 131 is less than the predetermined reference value of count Vcnt_ref, the count comparator 137 outputs the output pulse OP in an off-state.

The output pulse OP in the on-state has a logical value of '1' and the output pulse OP in the off-state has a logical value of '0'.

Accordingly, the output pulse OP output from the count comparator 137 may have a form of a square wave in which the on-state and the off-state are repeated.

In some implementations, the output pulse OP output from the count comparator 137 may be provided to the controller 140.

Accordingly, the controller 140 may determine whether the object is present on the working coil WC based on count and on-duty time of the output pulse OP received from the count comparator 137.

The shutdown circuit 139 may provide the switch driver 150 with the second pulse signal PWM2 for the detection operation of the vessel.

Specifically, the shutdown circuit 139 may provide the switch driver 150 with the second pulse signal PWM2, and the switch driver 150 may turn on or turn off the first and second switching elements S1 and S2 in the inverter 117 in a complementary manner based on the second pulse signal PWM2.

The second pulse signal PWM2 may include a signal PWM2-HIN (see FIG. 4) to control a turn-on or a turn-off of the first switching element S1 and a signal PWM2-LIN (see FIG. 4) to control a turn-on or a turn-off of the second switching element S2.

In some implementations, the state of the second pulse signal PWM2 (particularly, PWM2-HIN of FIG. 4) of the shutdown circuit 139 may be determined depending on the activation or the deactivation of the output signal OS received from the shutdown comparator 135.

Specifically, when the output signal OS is activated, the shutdown circuit 139 may provide the switch driver 150 with the second pulse signal in the off-state (that is, PWM2-HIN of a low level (logical value of '0')).

That is, the shutdown circuit 139 provides the switch driver 150 with the second pulse signal (that is, PWM2-HIN of FIG. 4) in the off-state so that the first switching element S1 is turned off.

When the output signal OS is deactivated, the shutdown circuit 139 may provide the switch driver 150 with the second pulse signal of the on-state (that is, PWM2-HIN of the high level (a logical value of '1')).

That is, the shutdown circuit 139 provides the switch driver 150 with the second pulse signal in the on-state (that is, PWM2-HIN of FIG. 4) so that the first switching element S1 is turned on.

The controller 140 controls the shutdown circuit 139 and the switch driver 150.

Specifically, the controller 140 may control the switch driver 150 by providing the shutdown circuit 139 with the first pulse signal PWM1.

Further, the controller 140 may receive the output pulse OP from the count comparator 137.

Specifically, the controller 140 may determine whether the object is present on the working coil WC based on the count or the on-duty time of the output pulse OP received from the count comparator 137.

When it is determined that the object is present on the working coil WC, the controller 140 activates (that is, drives) the working coil WC by controlling the switch driver 150.

The count may refer to a number of times at which the state of the output pulse OP is changed from the off-state to the on-state. The on-duty time may refer to an accumulated time until which the output pulse is in the on-state during a period of time (that is, D3 of FIG. 4) for which free resonance of resonance current occurs in a section where current flows including the working coil WC and the second switching element S2.

In some examples, the controller 140 may count a number of instances at which the output pulse OP is changed from an off-state (e.g., a low amplitude) to an on-state (e.g., a high amplitude), and determine the count of the first output pulse based on the number of instances at which the output pulse OP is changed from the off-state to the on-state.

Further, the controller 140 may enable displaying the detection of the object through a display or an input interface or may notify the user of the detection of the object through notification sound.

Figure 4:
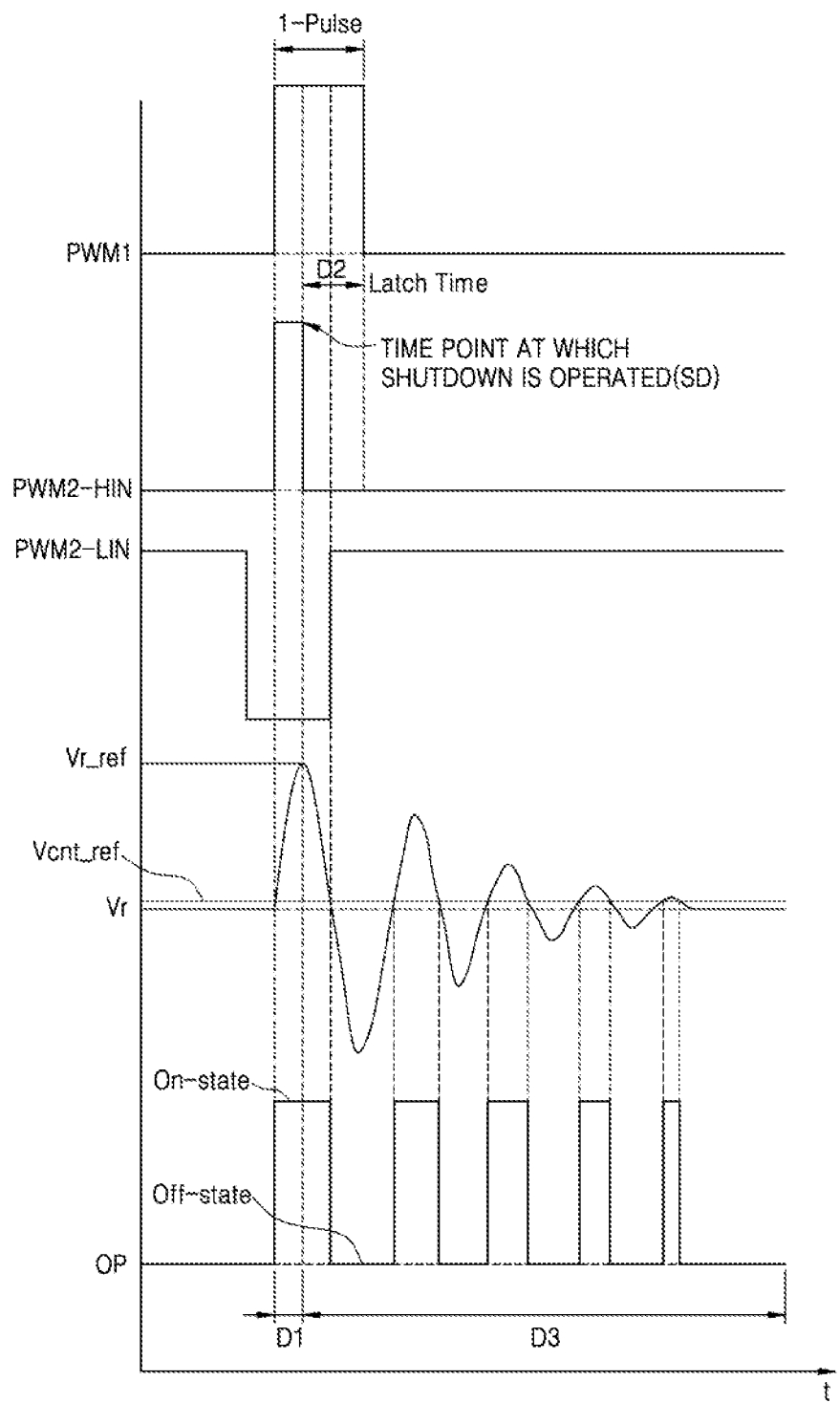
FIG. 4 is a graph of an example waveform generated when the detection operation of the vessel is performed in the induction heating device of FIG. 2.

In some implementations, the controller 140 may include, but is not limited to, a micro controller that outputs a first pulse signal PWM1 (i.e., a single pulse (1-pulse) of FIG. 4) of a predetermined magnitude.

The controller 140 may also sense or receive information (e.g., receive the information from the sensor 120) on the voltage (that is, first and second input voltage having different phases from each other generated by the three-phase power supply) applied to the inverter 117. A time point at which the vessel is detected is determined for the detection operation of the vessel based on the received information, and details thereof will be described below.

The switch driver 150 may be driven based on drive voltage, of the driver, received from an external power supply, and may be connected to the inverter 117 to control the switching of the inverter 117.

Further, the switch driver 150 may control the inverter 117 based on the second pulse signal PWM2 received from the shutdown circuit 139. That is, the switch driver 150 may turn on or off the first and second switching elements S1 and S2 the inverter 117 includes based on the second pulse signal PWM2.

In some implementations, the switch driver 150 may include first and second sub-switch drivers to turn on or off the first and second switching elements S1 and S2, respectively, and details thereof will be described below.

Hereinafter, a method for detecting a vessel, by the induction heating device, of FIG. 2 will be described with reference to FIGS. 4 to 6.

FIG. 4 is a graph of an example waveform generated during operation of detecting a vessel, by the induction heating device of FIG. 2. FIGS. 5 and 6 show example steps of a detection operation of a vessel, by the induction heating device of FIG. 2.

Figure 5:
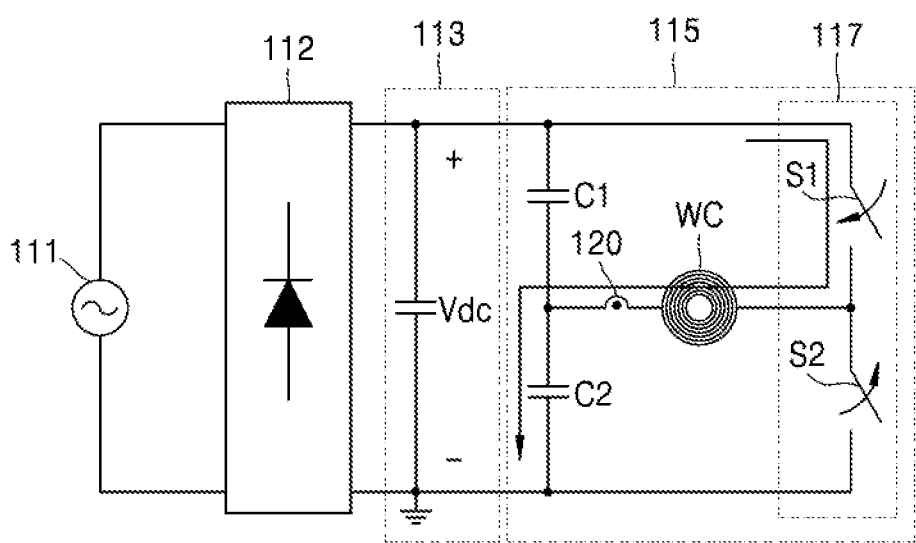
FIGS. 5 and 6 show an example detection operation of a vessel of an induction heating device of FIG. 2.
Figure 6:
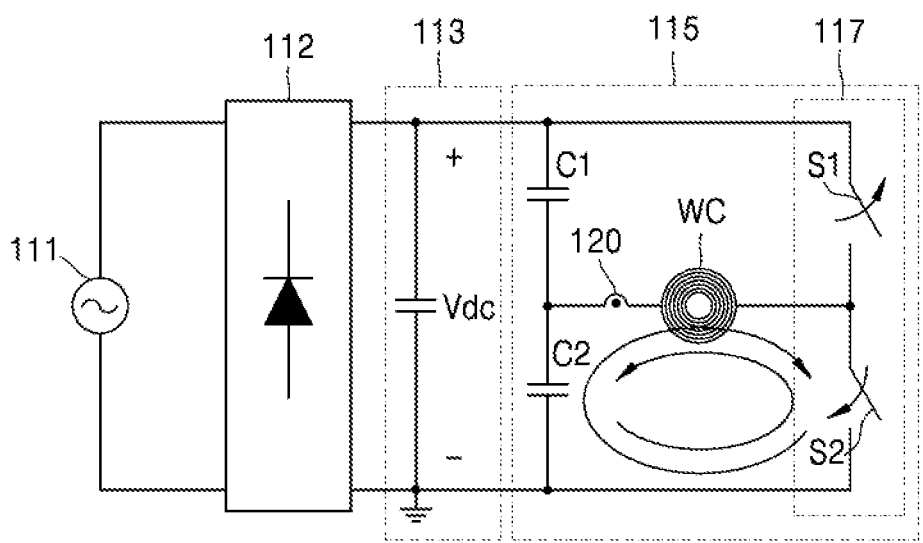

The above-described controller 180 is omitted from FIGS. 5 and 6 for convenience of explanation.

Referring to FIGS. 2 and 4 to 6, the controller 140 provides a shutdown circuit 139 with a first pulse signal PWM1. At this time, the controller 140 may provide the shutdown circuit 139 with a single pulse (1-pulse).

The shutdown circuit 139 transmits a second pulse signal (PWM2) to the switch driver 150 based on the single pulse (1-Pulse) received from the controller 140.

As shown in FIGS. 4 and 5, a switch driver 150 turns on the first switching element S1 and turns off the second switching element S2 while the second pulse signal (PWM2; that is, PWM2-HIN) is input, from the shutdown circuit 139.

In this process, the DC link capacitor 113 and the working coil WC to which the input voltage Vdc is applied may form a section in which the current flows, and energy of the input voltage Vdc may be transmitted to the working coil WC so that current passing through the working coil WC flows through the section in which the current flows.

The sensor 120 measures the value Ir of the current passing through the working coil WC and transmits the information on the measured current value Ir to the resonance current converter 131. The resonance current converter 131 converts the measured current value Ir (current value measured before the resonance current freely resonates) into a voltage value Vr (that is, a first voltage value), and provides a shutdown comparator 135 with the information on the converted voltage value Vr.

The shutdown comparator 135 compares the voltage value Vr received from the resonance current converter 131 with a predetermined reference value of resonance Vr_ref.

When the supplied voltage value Vr is greater than the predetermined reference value of resonance Vr_ref, the shutdown comparator 135 provides the shutdown circuit 139 with the activated output signal OS. A time point at which the shutdown circuit 139 receives the activated output signal OS from the shutdown comparator 135 corresponds to a time point at which the shutdown is performed SD.

That is, the working coil WC is charged with energy by the input voltage Vdc for a period of time of D1. Then, when the working coil WC is sufficiently charged with the energy and the working coil WC has an energy level exceeding a predetermined threshold value (that is, a predetermined reference value of resonance Vr_ref), the shutdown circuit 139 provides the switch driver 150 with the second pulse signal (PWM2: that is, PWM2-HIN) in the off-state so that the working coil WC is not charged with the energy.

Accordingly, the shutdown circuit 139 may control the switch driver 150 to store a predetermined magnitude of energy in the working coil WC. Further, as the free resonance of the resonance current constantly occurs in the section in which the current flows including the working coil WC and the second switching element S2, thereby improving accuracy and reliability in the function for detecting the vessel.

In addition, after a time point at which the shutdown is performed SD, the latch circuit 133 maintains the activated state of the output signal OS of the shutdown comparator 135 for a predetermined period of time D2 (i.e., a latch time) to prevent the output signal OS activated during the input, of the first pulse signal PWM1, to the shutdown circuit 139 from being deactivated.

Accordingly, when the output signal OS of the shutdown comparator 135 is activated once, the output signal OS of the shutdown comparator 135 may maintain an activated state for a predetermined period of time. Therefore, the shutdown circuit 139 may maintain the second pulse signal PWM2-HIN associated with the first switching element S1 in an off-state while the output signal OS is activated.

For example, when the output signal OS is activated and the second pulse signal PWM2 (that is, PWM2-HIN) in an off-state is provided from the shutdown circuit 139 to the switch driver 150, the first switching element S1 may be turned off so that the working coil WC may not be charged with the voltage (that is, energy). However, even if the first switching element S1 is turned off at the time point when the shutdown is performed SD, the voltage applied to the working coil WC may be slightly increased beyond the predetermined reference value of resonance Vr_ref after the time point at which the shutdown is performed SD and then decreases again.

When the voltage provided to the working coil WC falls to or below a predetermined reference value of resonance Vr_ref, the shutdown comparator 135 may receive the voltage value Vr_ref less than the predetermined reference value of resonance Vr_ref from the resonance current converter 131, and may deactivate the output signal OS. In this case, the first switching element S1 may be turned on again, while the shutdown circuit 139 provides the switch driver 150 with the second pulse signal PWM2 (that is, PWM2-HIN) in the on-state. As a result, the working coil WC that has already charged with the energy may be further charged with unnecessary energy.

In some implementations, in order to mitigate the behavior describe above, the latch circuit 133 may maintain the activation state of the output signal OS of the shutdown comparator 135 for a predetermined period of time D2 (i.e., a latch time) after the time point at which the shutdown is performed SD.

As shown in FIGS. 4 and 6, the shutdown circuit 139 may turn off the first switching element S1 and turns on the second switching element S2 after the time point at which the shutdown is performed SD so that the working coil WC, the second capacitor C2, and the second switching element S2 form the section through which the current flows.

After the section in which the current flows is formed, the working coil WC exchanges the energy with the capacitor C2, and the resonant current resonates freely and flows through the section in which the current flows.

When the object is not present on the working coil WC, amplitude of the resonant current may be reduced by resistance of the working coil WC.

When the object is present on the working coil WC, the amplitude of the resonant current may be reduced by the resistance of the working coil WC and the resistance of the object (that is, a significant magnitude of the amplitude of the resonance current is reduced compared to a case in which the object is not present on the working coil WC).

Then, the sensor 120 measures the value Ir of the current that resonates freely in the section in which the current flows, and provides the resonance current converter 131 with the information on the measured current value Ir. The resonance current converter 131 converts the current value Ir (i.e., the current value measured after the resonance current freely resonates) into a voltage value Vr (i.e., a second voltage value), and provides the count comparator 137 and the controller 140 with the information on the converted voltage value Vr, respectively.

In some examples, as the working coil WC has the constant resistance value, the voltage of the working coil WC has a waveform substantially equal to the current of the working coil WC.

Subsequently, the count comparator 137 compares the voltage value Vr with a predetermined reference value of count Vcnt_ref, and generates the output pulse OP based on the result of comparison. The count comparator 137 also provides the controller 140 with the output pulse OP.

The output pulse OP has an on-state when the voltage value Vr is greater than the predetermined reference value of count Vcnt_ref and an off-state when the voltage value Vr is less than the predetermined reference value of count Vcnt_ref.

The controller 140 determines whether the object is present on the working coil WC based on the output pulse OP received from the count comparator 137.

For example, when the count of the output pulse OP is less than a predetermined reference count, the controller 140 may determine that the object is present on the working coil WC. When the count of the output pulse OP is greater than a predetermined reference count, the controller 140 may determine that the object is not present on the working coil WC. The count may refer to a number of times at which the state of the output pulse OP is changed from the off-state to the on-state.

For example, when the on-duty time of the output pulse OP is less than a predetermined reference time, the controller 140 may determine that the object is present on the working coil WC. When the on-duty time of the output pulse OP is greater than the predetermined reference time, the controller 140 may determine that the object is not present on the working coil WC. The on-duty time may refer to an accumulated time until which the output pulse OP is in the on-state during the period of time after the time point at which the shutdown is performed SD (i.e., D3 in FIG. 4).

In some examples, the controller 140 may determine whether the output pulse OP corresponds to an on-state or an off-state based on an amplitude of the output pulse OP. The output pulse OP may include a plurality of on-state pulses and a plurality of off-state pulses in the period of time D3. The controller 140 may accumulate durations of the plurality of on-state pulses of the output pulse OP and may determine the on-duty time of the output pulse OP based on the accumulated durations of the plurality of on-state pulses of the output pulse OP.

That is, the controller 140 may accurately determine whether the object is present on the working coil based on the count or the on-duty time of the output pulse OP.

Then, the controller 140 activates the working coil WC based on the determination whether the object is present on the working coil WC. Further, the controller 140 may display the information on the detection of the object through the display or the interface or generate the notification sound to notify the user of the detection of the object.

Figure 7A:
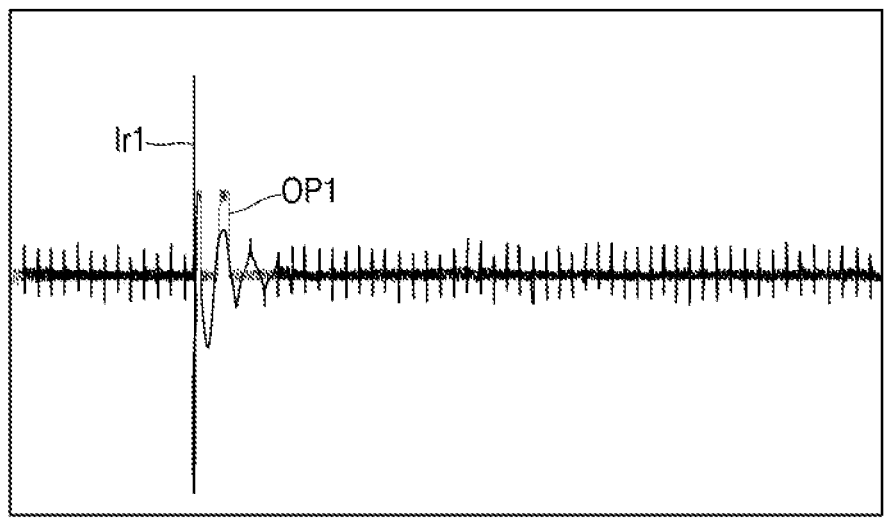
FIG. 7A and FIG. 7B are graphs of example waveforms used in determining when an object is present in the induction heating device of FIG. 2.
Figure 7B:
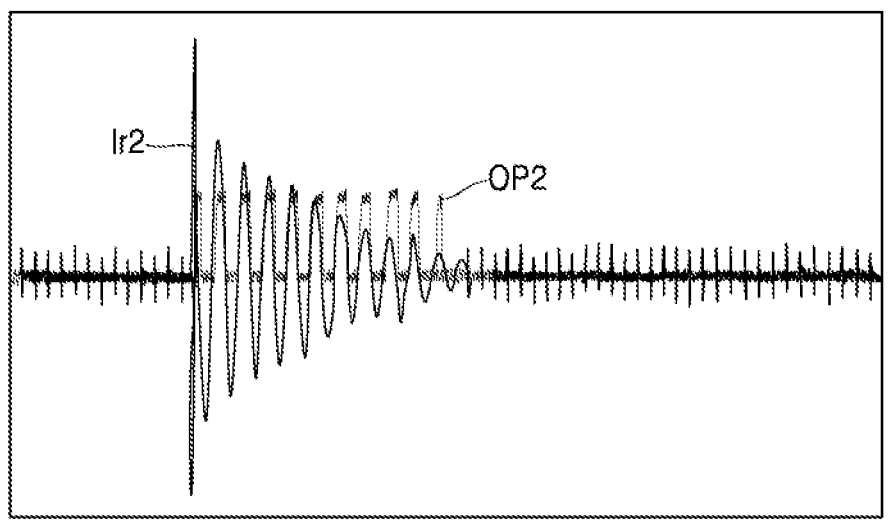

FIG. 7A and FIG. 7B are graphs of example waveforms used in determining whether an object is preset, in the induction heating device of FIG. 2.

For example, FIG. 7A is an example waveform generated when the object is arranged on a working coil WC. FIG. 7B is an example waveform generated when the object is not arranged on the working coil WC. FIGS. 7A and 7B are only experimental examples, and the implementation of the present disclosure is not limited to the experimental examples of FIG. 7A and FIG. 7B.

FIG. 7A shows a first resonance current Ir1 flowing through the working coil WC (see FIG. 2) and a first output pulse OP1 for first resonance current Ir1. Further, FIG. 7B shows a second resonance current Ir2 flowing through the working coil WC (see FIG. 2) and a second output pulse OP2 for the second resonance current Ir2.

Referring to FIGS. 2 and 7A and 7B, FIG. 7A shows that a count of the first output pulse OP1 is twice, and FIG. 7B shows a count of the second output pulse OP2 is 11 times. That is, the count is relatively less when the object is arranged on the working coil WC, while the count is relatively greater when the object is not arranged on the working coil WC.

Therefore, a reference count for determining whether the object is present on the working coil WC may be determined as a value between the count of FIG. 7A and the count of FIG. 7B. Further, the controller 140 may determine whether the object is present on the working coil WC based on a predetermined reference count.

Further, the on-duty time of the first output pulse OP1 as shown in FIG. 7A may be shorter than the on-duty time of the second output pulse OP2 as shown in FIG. 7B. That is, when the object is arranged on the working coil WC, the on-duty time is relatively short while the on-duty time is relatively long when the object is not arranged on the working coil WC.

Therefore, a reference time for determining whether the object is present on the working coil WC may be determined as a value corresponding to a time between the on-duty time of FIG. 7A and the on-duty time of FIG. 7B. Further, the controller 140 may determine whether the object is present on the working coil WC based on a predetermined reference time.

That is, the controller 140 may improve accuracy in the determination as to whether the object is present on the working coil WC based on at least one of the count and the on-duty time of an output pulse OP.

In some implementations, in the induction heating device 100, the first input voltage and the second input voltage having different phases from each other are generated by the three-phase power supply, and thus, the induction heating device 100 has an additional technical feature for determining a time point at which the vessel is detected. Hereinafter, a method for detecting the vessel performed by a controller 180 of the induction heating device 100 will be described with reference to FIGS. 8 to 12.

Figure 8:
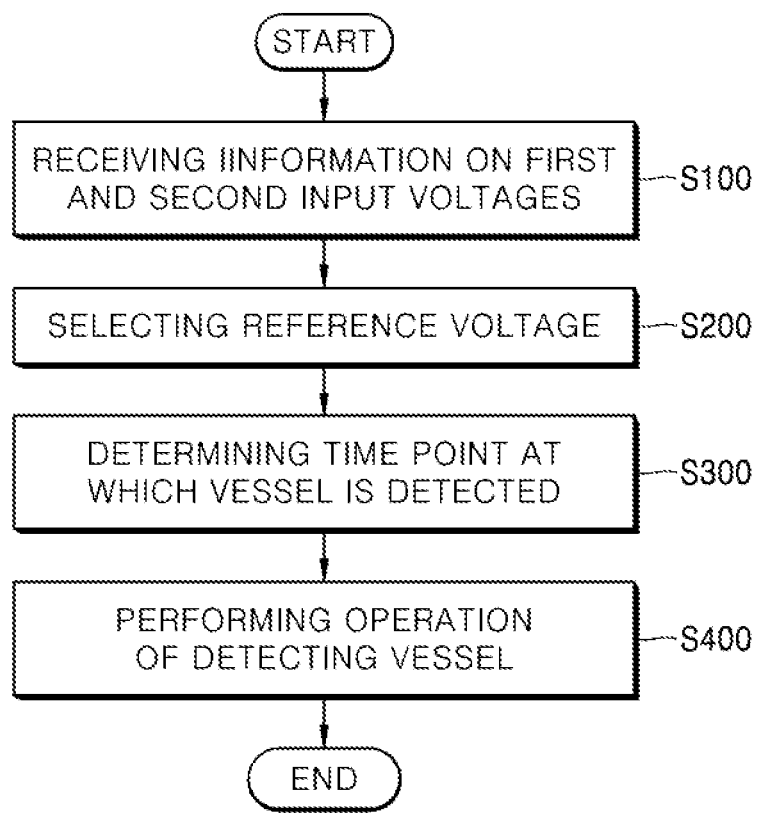
FIG. 8 is a flowchart of an example method for detecting a vessel of the induction heating device of FIG. 2.
Figure 9:
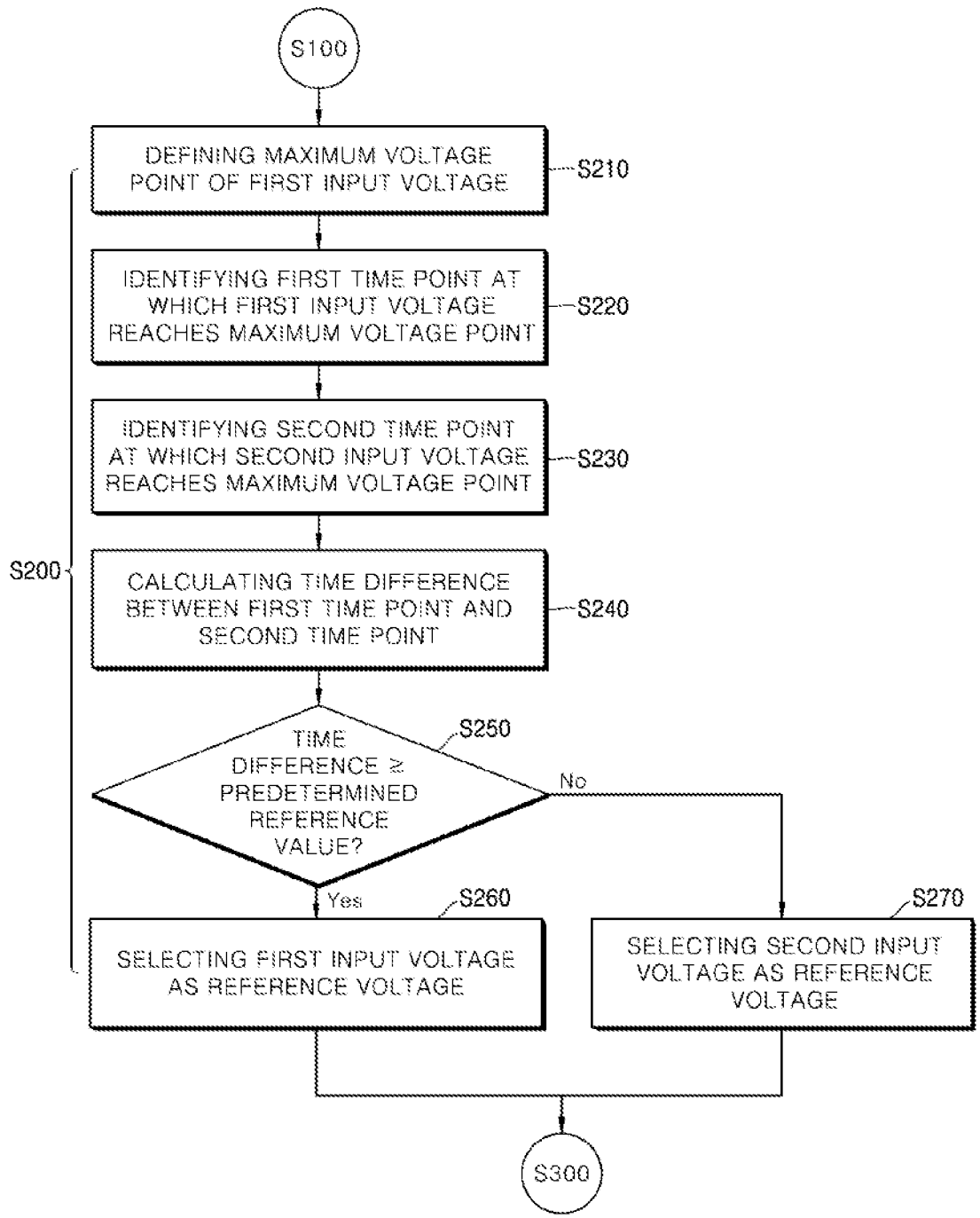
FIG. 9 is a flowchart of an example method of selecting a reference voltage of FIG. 8.
Figure 10:
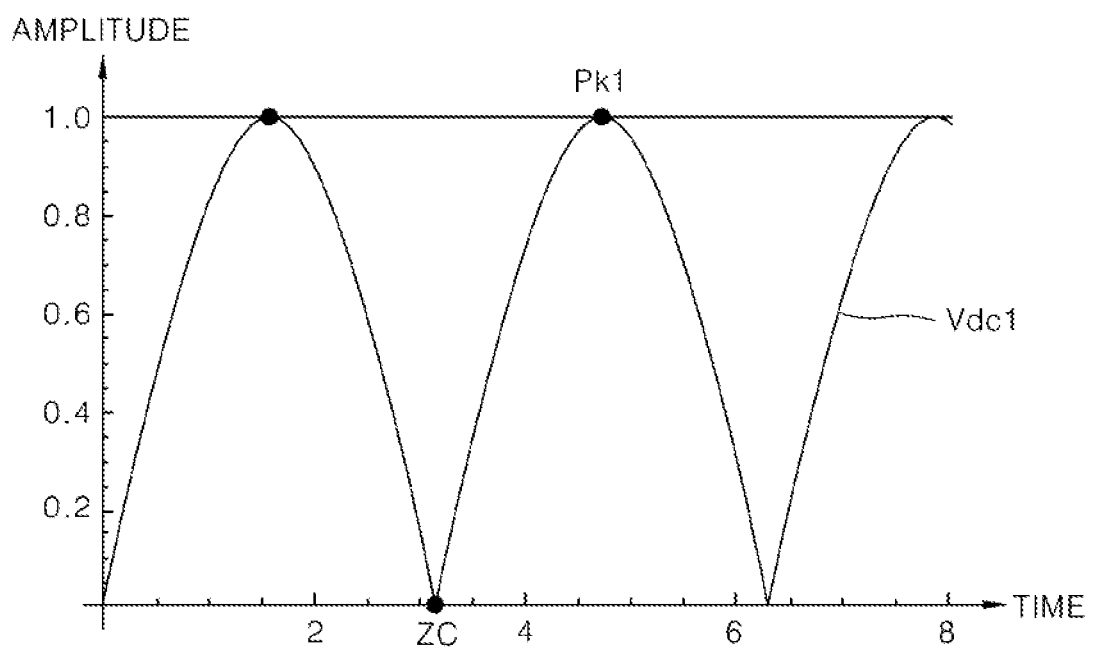
FIGS. 10 to 12 are graphs of example waveforms used in the method for detecting the vessel of FIG. 8.
Figure 11:
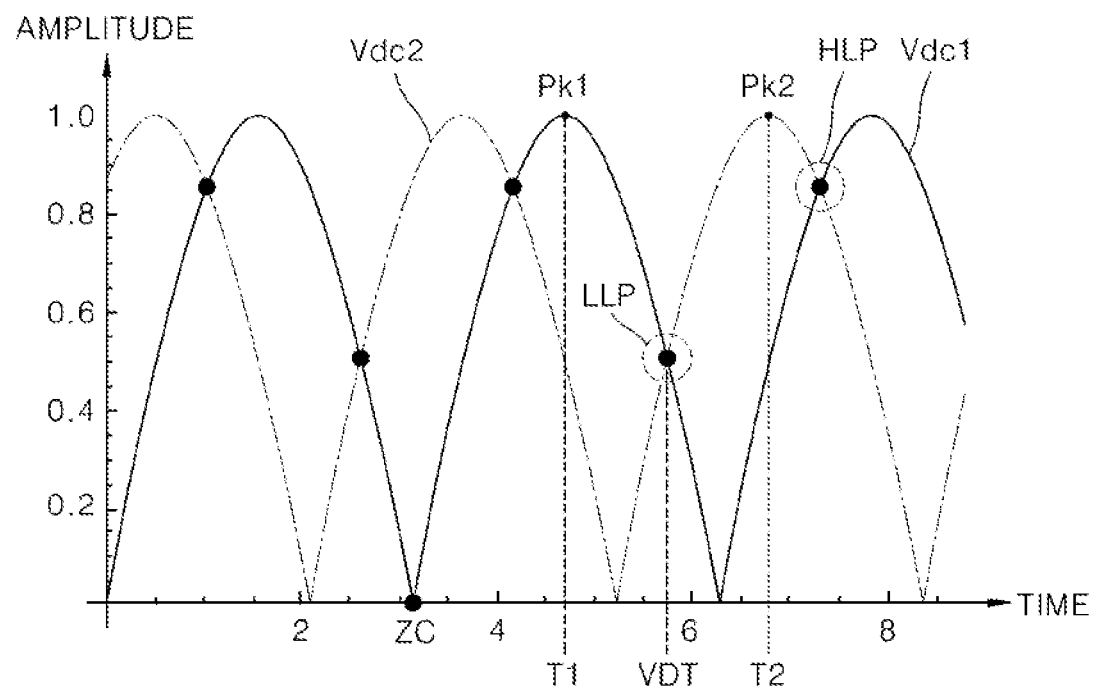
Figure 12:
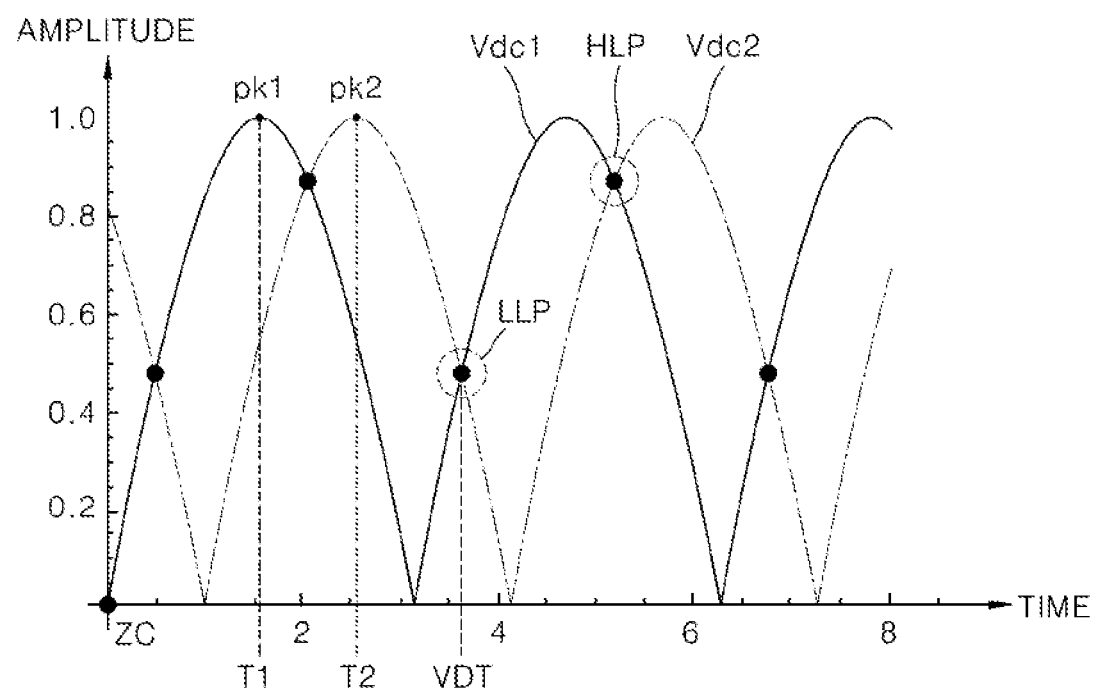

FIG. 8 is a flowchart showing an example method for detecting a vessel of the induction heating device of FIG. 2. FIG. 9 is a flowchart showing S200 of FIG. 8 in detail. FIGS. 10 to 12 are example graphs further showing the method for detecting the vessel of FIG. 8.

For convenience of explanation, it is considered that the sensor 120 (see FIG. 2) includes the controller 180 (see FIG. 2).

Referring to FIGS. 2 and 8, first, information on the first input voltage and the second input voltage having different phases from each other generated by the three-phase power supply is received (S100).

In some implementations, the controller 140 directly senses information on the input voltage (for example, the first input voltage and the second input voltage Vdc1 and Vdc2 having different phases from each other generated by the three-phase power supply shown in FIG. 11) applied to an inverter 117 or a DC link capacitor 113 or may receive the information from the sensor 120 (see FIG. 2).

The first input voltage and the second input voltage (for example, Vdc1 and Vdc2 in FIG. 11) may be output from the power supply 111. In some examples, the first input voltage and the second input voltage may be rectified in a half wave rectification form by the rectifier 112, and the first input voltage and the second input voltage (for example, Vdc1 and Vdc2 in FIG. 11) rectified by the rectifier 112 may be applied to the inverter 117 that drives the working coil WC. In some examples, the first input voltage and the second input voltage (e.g., Vdc1 and Vdc2 in FIG. 11) are generated by a three-phase power supply and have different phases from each other (for example, a phase difference of 30°), amplitude (that is, a magnitude of voltage) and a frequency (that is, a period) of the first input voltage and the second input voltage may be the same.

In some implementations, the information on the first input voltage and the second input voltage (for example, Vdc1 and Vdc2 in FIG. 11) may include information on a waveform corresponding to each of the first input voltage and the second input voltage and information on a point at which the waveform of the first input voltage and the waveform of the second input voltage intersect each other, and the like.

When the information on the first input voltage and the second input voltage is received (S100), a reference voltage is selected among the first input voltage and the second input voltage based on the received information (S200).

Referring to FIGS. 2 and 9 to 11, S200 begins with defining a maximum voltage point of the first input voltage based on a zero voltage time point of the first input voltage (S210).

In some implementations, before the maximum voltage point is determined, the controller 140 may select the first input voltage Vdc1 or the second input voltage Vdc2 as a preliminary reference voltage to select the reference voltage. For example, in some implementations, the controller 140 may select the first input voltage Vdc1 as the preliminary reference voltage. In other implementations, the controller 140 may select the second input voltage Vdc2 as the preliminary reference voltage.

Specifically, the controller 140 may define a maximum voltage point Pk1 of the first input voltage Vdc1 based on the zero voltage time point ZC of the first input voltage Vdc1 selected as the preliminary reference voltage.

In some examples, the controller 140 may determine an amplitude of the first input voltage Vdc1 that is normalized with respect to a voltage range between the zero voltage point ZC and the maximum voltage point Pk1 of the first input voltage Vdc1.

For example, as shown in FIG. 10, the maximum voltage point Pk1 of the first input voltage Vdc1 may be defined as a point at which the waveform of the first input voltage Vdc1 becomes '1'.

As described above, when the maximum voltage point of the first input voltage Vdc1 is determined (S210), a first time point T1 at which the first input voltage Vdc1 reaches the maximum voltage point Pk1 is identified (S220).

Specifically, as shown in FIG. 11, the controller 140 may determine that the time point at which the first input voltage Vdc1 reaches the maximum voltage point Pk1 is the first time point (for example, T1).

In some examples, the first input voltage Vdc1 periodically reaches the maximum voltage point, and any one of time points at which the maximum voltage point is reached may be determined as a first time point T1.

When the first time point T1 is identified (S220), a second time point T2 at which the second input voltage Vdc2 reaches a maximum voltage point Pk2 is identified (S230).

Specifically, the controller 140 may determine that the time point at which the second input voltage Vdc2 reaches the maximum voltage point Pk2 after the first time point T1 is a second time point (for example, T2).

The second input voltage Vdc2 is different from the first input voltage Vdc1 in phase but amplitude (i.e., voltage magnitude) of the second input voltage Vdc2 is the same as the first input voltage Vdc1 and the amplitude '1' corresponding to the maximum voltage point Pk2 of the second input voltage Vdc2 may be the same as the amplitude '1' corresponding to the maximum voltage point Pk1 of the first input voltage Vdc1.

When a second time point T is identified (S230), a time difference between the first time point T1 and the second time point T2 is calculated (S240).

Specifically, the controller 140 may calculate the time difference between the first time point T1 and the second time point T2.

For example, a value corresponding to the time difference may be represented by an absolute value (i.e., |T1−T2|), but is not limited thereto.

When the time difference is calculated (S240), the calculated time difference is compared with a preset reference value (S250).

Specifically, the controller 140 may convert a value corresponding to the time difference to an absolute value, and compare the absolute value with a predetermined reference value.

Then, the controller 140 compares the calculated time difference with a preset reference value (S250), and then selects a reference voltage based on the comparison result (S260, S270).

Specifically, when the calculated time difference is equal to or greater than a preset reference value, the controller 140 may select the first input voltage Vdc1 as the reference voltage (S260).

When the calculated time difference is less than the predetermined reference value, the controller 140 may select the second input voltage Vdc2 as the reference voltage (S270).

In the example shown in FIG. 11, the waveforms of the first input voltage and the second input voltage Vdc1 and Vdc2 are illustrated, and the first input voltage Vdc1 may be selected as the reference voltage.

For example, the waveform of the first input voltage Vdc1 may be |sin (x)| and a waveform of the second input voltage Vdc2 may be |cos($\pi$/6−x)|.

FIG. 12 shows a different case than the example shown in FIG. 11. FIG. 12 shows the waveforms of the first input voltage and the second input voltage Vdc1 and Vdc2, where the second input voltage Vdc2 may be selected as the reference voltage.

In the example shown in FIG. 12, the waveform of the first input voltage Vdc1 may be |sin (x)| and a waveform of the second input voltage Vdc2 may be |cos(x+$\pi$/6).

Referring back to FIGS. 2 and 8, after selecting the reference voltage is completed (S200), a time point at which the vessel is detected is determined based on the selected reference voltage (S300).

Specifically, the controller 140 may determine a time point at which the selected reference voltage reaches a point at which a voltage level is lower, among points at which a waveform of the first input voltage Vdc1 intersects with a waveform of the second input voltage Vdc2, after the selected reference voltage reaches a maximum voltage point, as a time point at which the vessel is detected because the less the input voltage level is, the more the noise caused by the operation of the working coil adjacent to the working coil to be detected is minimized.

In some implementations, as shown in FIG. 11, when the first input voltage Vdc1 is selected as the reference voltage, the controller 140 may determine a time point VDT at which a voltage level reaches a low level point LLP among points at which the waveform of the first input voltage Vdc1 intersects with the waveform of the second input voltage Vdc2 (LLP, HLP; for example, LLP is a point corresponding to amplitude which is about 0.5 times of amplitude ('1') and HLP is a point corresponding to amplitude which is about 0.87 times of amplitude ('1') after the first input voltage Vdc1 reaches a maximum voltage point (e.g., Pk1) as a time point at which the vessel is detected.

In some cases, the low voltage points (LLP) may correspond to a voltage level in a range of 40% to 60% of the maximum voltage level Pk1, and the high voltage points (HLP) corresponding to a voltage level in a range of 70% to 90% of the maximum voltage level Pk1. The controller 140 may determine a time point corresponding to one of the low voltage points as the detection time point.

In some implementations, as shown in FIG. 12, when the second input voltage Vdc2 is selected as the reference voltage, the controller 140 may determine the time point VDT at which the selected reference voltage reaches a point LLP at which a voltage level is lower, among points LLP and HLP at which the waveform of the first input voltage Vdc1 intersects with the waveform of the second input voltage Vdc2 after the second input voltage Vdc2 reaches the maximum voltage point (e.g., Pk2), as a time point at which the vessel is detected.

When the time point at which the vessel is detected is determined (S300), detection operation for the working coil WC is performed at the determined time point at which the vessel is detected (S400).

Specifically, each component of the controller 180 may perform the detection operation of the vessel based on the steps and methods described above with reference to FIGS. 4 to 6.

In some implementations, the process S400 of performing the detection operation of the vessel (S400) may include: controlling, by a switch driver 150, an inverter 117 to charge a working coil WC with energy; measuring, by a sensor 120, current flowing through the working coil WC; and converting, by the resonance current converter 131, a value of current measured by the sensor 120 into a first voltage value.

The process 400 may further include: comparing, by the shutdown comparator 135, the first voltage value with the predetermined reference value of resonance Vr_ref; controlling, by the shutdown circuit 139, the switch driver 150 to freely resonate the current flowing through the working coil We when the first voltage value is greater than the predetermined reference value of resonance Vr_ref; measuring, by the sensor 120, the current that freely resonates; and converting, by the resonance current converter 131, the value of the current that freely resonates measured by the sensor 120 into a second voltage value.

The process 400 may further include: comparing, by the count comparator 137, the second voltage value with the predetermined reference value of count Vcnt_ref to generate an output pulse OP; and comparing, by the controller 140, the count of the output pulse OP with the predetermined reference count or comparing the on-duty time with the predetermined reference time to determine whether the object is present on the working coil WC.

That is, at a time point VDT at which the selected reference voltage reaches the point LLP at which a voltage level is lower, among the points LLP and HLP at which the waveforms of the first input voltage and the second input voltage Vdc1 and Vdc2 intersect with each other, the above-mentioned detection operation of the vessel is always performed, thereby minimizing the noise caused by the operation of the working coil adjacent to the working coil to be detected.

Moreover, as the detection operation of the vessel is generally performed at a constant voltage level, the accuracy and reliability in the detection operation of the vessel may be improved.

As described above, according to the implementation of the present disclosure, as the noise caused by the operation of the working coil adjacent to the working coil to be detected may be minimized through the method for detecting the vessel of the induction heating device, the accuracy of the detection operation of the vessel may be improved.

Further, according to the implementation of the present disclosure, as the accuracy in detecting the vessel may be improved through the method for detecting the vessel, of the induction heating device, the reliability in the detection operation of the vessel may be improved.

It is to be understood that the above-described implementations are to be considered in all respects as illustrative and not restrictive, and the scope of the present disclosure will be indicated by the appended claims described below rather than by the above-mentioned detailed description. It is to be construed that meaning and scope of claims described below, as well as all changes and modification obtained from equivalents thereof are included in the scope of the present disclosure.

What is claimed is:

1. A method for controlling an induction heating device that is configured to operate based on a multi-phase power supply and includes at least one working coil configured to heat an object and a controller configured to detect the object, the method comprising:
   receiving, by the controller, voltage information related to a first input voltage for driving a first working coil of the at least one working coil and a second input voltage for driving a second working coil of the at least one working coil, wherein the first input voltage and the second input voltage are supplied by the multi-phase power supply and have different phases from each other;
   selecting, by the controller, a reference voltage among the first input voltage and the second input voltage based on the voltage information;
   determining, by the controller, a detection time point based on the reference voltage, the detection time point corresponding to a time instant at which a detection operation is to be performed for detecting the object on the at least one working coil; and
   performing, by the controller, the detection operation at the detection time point.

2. The method of claim 1, wherein selecting the reference voltage among the first input voltage and the second input voltage comprises:
   determining a maximum voltage point of the first input voltage based on a time instant of a zero voltage point of the first input voltage;
   identifying a first time point corresponding to the maximum voltage point of the first input voltage;
   identifying a second time point corresponding to a maximum voltage point of the second input voltage;
   determining a time difference between the first time point and the second time point;
   comparing the time difference to a predetermined reference value; and
   based on a result of the comparison, selecting one of the first input voltage or the second input voltage as the reference voltage.

3. The method of claim 2, wherein selecting the reference voltage based on the result of the comparison comprises:
   based on the time difference being greater than or equal to the predetermined reference value, selecting the first input voltage as the reference voltage; and
   based on the time difference being less than the predetermined reference value, selecting the second input voltage as the reference voltage.

4. The method of claim 1, wherein determining the detection time point comprises:
   determining intersection time points at which a first waveform corresponding to the first input voltage and a second waveform corresponding to the second input voltage intersect each other;
   determining intersection voltage levels corresponding to the intersection time points;
   determining maximum time points at which the reference voltage reaches a maximum voltage level; and
   determining the detection time point among the intersection time points, the detection time point that is subsequent to one of the maximum time points and that corresponds to an intersection voltage level lower than other intersection voltage levels.

5. The method of claim 1, wherein the induction heating device further includes a rectifier configured to rectify an input voltage into a half-wave form and an inverter configured to drive the at least one working coil, and
   wherein the method further comprises:
     rectifying a voltage output from the multi-phase power supply to generate both the first input voltage and the second input voltage in the half-wave form; and
     applying one of the first input voltage or the second input voltage to the inverter to drive the first working coil or the second working coil.

6. The method of claim 1, wherein the voltage information comprises:
   information on a first waveform corresponding to the first input voltage and a second waveform corresponding to the second input voltage; and
   information on one or more time points at which the first waveform intersects the second waveform.

7. The method of claim 1, wherein performing the detection operation comprises:
   controlling an inverter of the induction heating device to charge the at least one working coil with energy;
   receiving a current value of the at least one working coil measured by a sensor of the induction heating device;
   converting the current value into a first voltage value;
   comparing the first voltage value to a predetermined reference resonance value;
   controlling the inverter to cause resonance of a current in the at least one working coil based on the first voltage value being greater than the predetermined reference resonance value;
   receiving a resonant current value of the at least one working coil measured by the sensor;
   converting the resonant current value into a second voltage value;

comparing the second voltage value to a predetermined reference count value to generate an output pulse;

comparing at least one of (i) a count of the output pulse to a predetermined reference count, or (ii) an on-duty time of the output pulse to a predetermined reference time; and determining whether the object is present on the at least one working coil based on a result of the comparison.

8. The method of claim 7, wherein the inverter comprises a first switching element and a second switching element that are configured to be turned on and off by a switching signal received from the controller, and wherein controlling the inverter comprises controlling one or both of the first switching element and the second switching element.

9. The method of claim 8, wherein charging the at least one working coil with energy comprises:

turning on the first switching element and turning off the second switching element.

10. The method of claim 8, wherein controlling the inverter to cause the resonance of the current in the at least one working coil comprises:

turning off the first switching element and turning on the second switching element.

11. The method of claim 8, wherein controlling the inverter to cause the resonance of the current in the at least one working coil comprises:

maintaining an output signal of a shutdown comparator of the controller in an activated state for a predetermined period of time, the output signal of the shutdown comparator corresponding to a comparison result of the first voltage value and the predetermined reference resonance value.

12. The method of claim 7, wherein comparing the second voltage value to the predetermined reference count value to generate the output pulse comprises:

generating the output pulse in an on-state based on the second voltage value being greater than the predetermined reference count value; and generating the output pulse in an off-state based on the second voltage value being less than the predetermined reference count value.

13. The method of claim 12, wherein the count of the output pulse comprises a number of instances at which the output pulse is changed from the off-state to the on-state, and wherein determining whether the object is present on the at least one working coil comprises:

determining that the object is present on the at least one working coil based on the count being less than the predetermined reference count; and determining that the object is not present on the at least one working coil based on the count being greater than the predetermined reference count.

14. The method of claim 12, wherein the on-duty time of the output pulse comprises an accumulated time for the on-state of the output pulse, and wherein determining whether the object is present on the at least one working coil comprises:

determining that the object is present on the at least one working coil based on the on-duty time being less than the predetermined reference time; and determining that the object is not present on the at least one working coil based on the on-duty time being greater than the predetermined reference time.

15. The method of claim 1, wherein receiving the voltage information comprises:

sensing, by a sensor of the induction heating device, a voltage that is applied to the at least one working coil and that includes a plurality of phases; and based on the sensed voltage, determining a first waveform corresponding to the first input voltage and a second waveform corresponding to the second input voltage.

16. The method of claim 4, wherein the intersection voltage levels comprise:

a plurality of low voltage points corresponding to a voltage level in a range of 40%-60% of the maximum voltage level; and a plurality of high voltage points corresponding to a voltage level in a range of 70%-90% of the maximum voltage level, and wherein determining the detection time point comprises determining a time point corresponding to one of the plurality of low voltage points among the intersection time points.

17. The method of claim 7, wherein performing the detection operation further comprises:

based on an amplitude of the output pulse, determining whether the output pulse corresponds to an on-state or an off-state, wherein the output pulse comprises a plurality of on-state pulses and a plurality of off-state pulses;

accumulating durations of the plurality of on-state pulses of the output pulse; and determining the on-duty time of the output pulse based on the accumulated durations of the plurality of on-state pulses of the output pulse.

18. The method of claim 7, wherein performing the detection operation further comprises:

counting a number of instances at which the output pulse is changed from an off-state to an on-state; and determining the number of instances as the count of the output pulse.

19. The method of claim 4, wherein determining the intersection time points comprises determining time instants at which the first waveform and the second waveform have an equal amplitude.

20. The method of claim 2, wherein determining the maximum voltage point of the first input voltage comprises:

determining an amplitude of the first input voltage that is normalized with respect to a voltage range between the zero voltage point and the maximum voltage point of the first input voltage.

\* \* \* \* \*